(12) United States Patent
Mao et al.

(10) Patent No.: US 10,372,228 B2
(45) Date of Patent: Aug. 6, 2019

(54) METHOD AND SYSTEM FOR 3D HAND SKELETON TRACKING

(71) Applicant: uSens, Inc., San Jose, CA (US)

(72) Inventors: Wentao Mao, San Jose, CA (US); Xu Zhang, San Jose, CA (US); Gengyu Ma, Beijing (CN); Yue Fei, San Jose, CA (US)

(73) Assignee: uSens, Inc., San Jose, CA (US)

( * ) Notice: Subject to any disclaimer, the term of this patent is extended or adjusted under 35 U.S.C. 154(b) by 20 days.

(21) Appl. No.: 15/649,716

(22) Filed: Jul. 14, 2017

(65) Prior Publication Data

US 2018/0024641 A1 Jan. 25, 2018

Related U.S. Application Data

(60) Provisional application No. 62/364,783, filed on Jul. 20, 2016.

(51) Int. Cl.
*G06F 3/00* (2006.01)
*G06F 3/01* (2006.01)
(Continued)

(52) U.S. Cl.
CPC ............ *G06F 3/017* (2013.01); *A63F 13/213* (2014.09); *A63F 13/428* (2014.09); *G06F 3/011* (2013.01);
(Continued)

(58) Field of Classification Search
CPC .......... G06F 3/017; G06F 3/011; G06T 7/251; G06T 7/285; G06T 7/75;
(Continued)

(56) References Cited

U.S. PATENT DOCUMENTS

| 6,104,379 A | 8/2000 | Petrich |
| 7,352,880 B2 | 4/2008 | Kim |

(Continued)

FOREIGN PATENT DOCUMENTS

| CN | 102830798 | 12/2012 |
| CN | 103530892 | 1/2014 |

(Continued)

OTHER PUBLICATIONS

International Search Report and Written Opinion Application No. PCT/US2017/042041, dated Sep. 22, 2017.

*Primary Examiner* — Jerome Grant, II
(74) *Attorney, Agent, or Firm* — Sheppard Mullin Richter & Hampton LLP

(57) ABSTRACT

A tracking system is disclosed. The system may comprise a processor and a non-transitory computer-readable storage medium coupled to the processor and storing instructions that, when executed by the processor, cause the system to perform a method. The method may comprise training a detection model and an extraction model, capturing one or more images of at least a portion of an object, detecting the portion of the object in each of the one or more images through the trained detection model, tracking the detected portion of the object in real-time, obtaining 2D positions of one or more locations on the tracked portion of the object through the trained extraction model, and obtaining 3D positions of the one or more locations on the tracked portion of the object based at least in part on the obtained 2D positions.

30 Claims, 13 Drawing Sheets

(51) Int. Cl.
*G06T 7/73* (2017.01)
*G06K 9/00* (2006.01)
*A63F 13/428* (2014.01)
*A63F 13/213* (2014.01)
*G06T 7/246* (2017.01)
*G06T 7/285* (2017.01)

(52) U.S. Cl.
CPC ..... *G06K 9/00355* (2013.01); *G06K 9/00389* (2013.01); *G06T 7/251* (2017.01); *G06T 7/285* (2017.01); *G06T 7/75* (2017.01); *A63F 2300/6045* (2013.01); *G06T 2207/30196* (2013.01)

(58) Field of Classification Search
CPC ...... G06T 2207/30196; G06K 9/00355; G06K 9/00389; A63F 13/428; A63F 13/213; A63F 2300/6045
USPC .......................................................... 382/103
See application file for complete search history.

(56) References Cited

U.S. PATENT DOCUMENTS

| | | | |
|---|---|---|---|
| 8,773,512 B1 * | 7/2014 | Rafii | G06F 3/017 348/47 |
| 8,774,464 B2 | 7/2014 | Adhikari | |
| 8,938,124 B2 | 1/2015 | Eilat | |
| 8,941,588 B2 | 1/2015 | Minnen | |
| 8,971,572 B1 * | 3/2015 | Yin | G06K 9/00355 345/173 |
| 9,111,135 B2 | 8/2015 | Hummel | |
| 9,153,028 B2 | 10/2015 | Holz | |
| 2007/0104351 A1 | 5/2007 | Yang | |
| 2009/0306509 A1 | 12/2009 | Pedersen | |
| 2011/0317871 A1 | 12/2011 | Tossell | |
| 2012/0070070 A1 | 3/2012 | Litvak | |
| 2013/0294651 A1 | 11/2013 | Zhou | |
| 2014/0022164 A1 | 1/2014 | Adhikari | |
| 2014/0192147 A1 | 7/2014 | Mack | |
| 2014/0241570 A1 | 8/2014 | Onen | |
| 2015/0086108 A1 * | 3/2015 | Craig | G06F 21/32 382/154 |
| 2015/0186748 A1 * | 7/2015 | Cootes | G06K 9/6282 382/159 |
| 2015/0378444 A1 | 12/2015 | Yin | |
| 2016/0048726 A1 | 2/2016 | Tang | |
| 2016/0085310 A1 | 3/2016 | Shotton | |
| 2016/0086349 A1 | 3/2016 | Shotton | |
| 2017/0168586 A1 * | 6/2017 | Sinha | G06F 3/017 |
| 2018/0285635 A1 * | 10/2018 | Arata | G06K 9/00375 |

FOREIGN PATENT DOCUMENTS

| | | | |
|---|---|---|---|
| CN | 103559505 | 2/2014 | |
| CN | 103593679 | 2/2014 | |
| CN | 105023280 | 11/2015 | |
| CN | 201611236595 | * 12/2016 | ............ G06F 3/17 |
| CN | 201611236595 | * 5/2017 | ............ G06F 3/017 |
| EP | 2718900 | 4/2014 | |

* cited by examiner

700a

METHOD AND SYSTEM FOR 3D HAND SKELETON TRACKING

CROSS REFERENCE TO RELATED APPLICATIONS

This application is based on and claims the benefit of priority to U.S. Provisional Application No. 62/364,783, filed with the United States Patent and Trademark Office on Jul. 20, 2016, and entitled "METHODS AND SYSTEMS FOR 3D HAND SKELETON TRACKING," which is hereby incorporated by reference in its entirety.

TECHNICAL FIELD

The present disclosure relates generally to methods and systems for computer vision, and more particularly, to methods and systems for 3D hand skeleton tracking.

BACKGROUND

Gesture recognition is one of the most sought-after topics of 3D computer vision. Through gesture recognition, humans can communicate nonverbally and interact with machines naturally without any mechanical input device. Thus, a wide variety of applications have been enabled or advanced by the gesture recognition technology, for example, animation production and movie effects, interactive gaming, robotics control, home appliance control, medical device automation, driverless car control, etc. Gestures generally include movements of the hands, face, and/or other body parts. Since humans commonly use hands to express emotions, give commands, or perform other types of communication, 3D hand skeleton tracking, as a method for accurately capturing hand or finger positions, postures, and movements, falls right in the frontier of the technological development. To this end, various hand or hand skeleton tracking models have been developed to simulate human skeletons in real time.

SUMMARY

One aspect of the present disclosure is directed to a tracking system. The system may comprise a processor and a non-transitory computer-readable storage medium coupled to the processor. The non-transitory computer-readable storage medium may store instructions that, when executed by the processor, cause the system to perform a method. The method may comprise training a detection model and an extraction model, capturing one or more images of at least a portion of an object, detecting the portion of the object in each of the one or more images through the trained detection model, tracking the detected portion of the object in real-time, obtaining 2D positions of one or more locations on the tracked portion of the object through the trained extraction model, and obtaining 3D positions of the one or more locations on the tracked portion of the object based at least in part on the obtained 2D positions.

Another aspect of the present disclosure is directed to a method for computer vision. The method may comprise training a detection model and an extraction model, capturing one or more images of at least a portion of an object, detecting the portion of the object in each of the one or more images through the trained detection model, tracking the detected portion of the object in real-time, obtaining 2D positions of one or more locations on the tracked portion of the object through the trained extraction model, and obtaining 3D positions of the one or more locations on the tracked portion of the object based at least in part on the obtained 2D positions.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several embodiments and, together with the description, serve to explain the disclosed principles.

DETAILED DESCRIPTION

Figure 1:
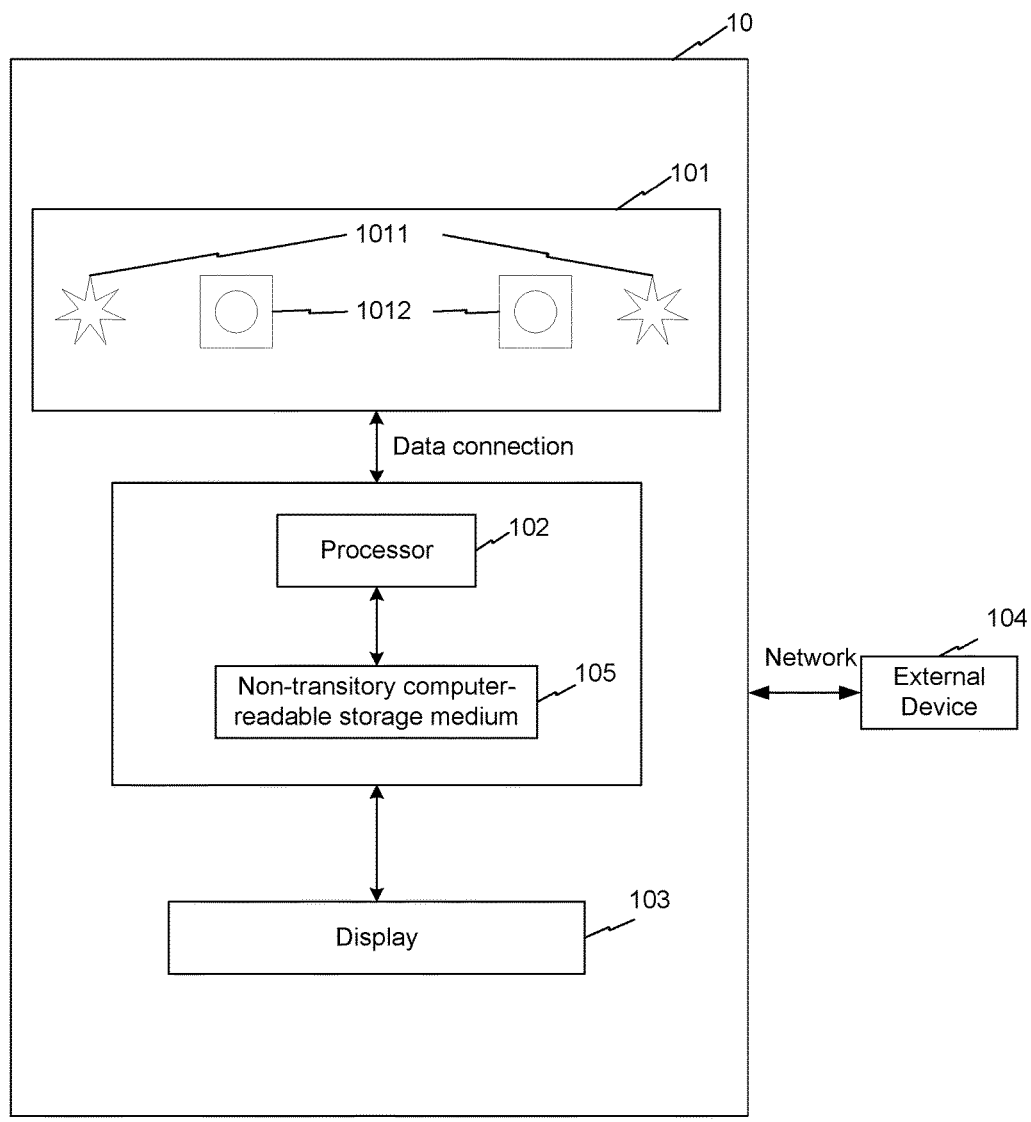
FIG. 1 is a block diagram illustrating a system for 3D hand skeleton tracking, consistent with exemplary embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Under conventional approaches, 3D hand skeleton tracking can pose several challenges. First, accurate and fast tracking at the finger joint level is hardly achievable for existing technologies. Second, current tracking hardware systems based on cell phone RGB cameras or depth cameras are not suitable for mobile hand motion detection, due to narrow viewing angles of such cameras. Third, current technologies do not satisfy hierarchical and articulated constraints of a biological hand, such as bone lengths, joint angles, etc. In one example, three-dimensional hand tracking using depth sequences disclosed in U.S. Patent Application No. 2016/0048726 does not work robustly with difficult cases, and does not extract hand skeletons. In another example, hand pose tracking using a forearm-hand model disclosed in U.S. Patent Application No. 2016/0086349 requires matching captured gestures with a stored gesture database, is heavily database-dependent, and is not suitable for mobile applications, because the database cannot cover all possible gestures. In yet another example, real time hand tracking, pose classification, and interface control disclosed in U.S. Patent Application No. 2014/0022164 only work in easy scenarios and require heavy computation processes, which tend to significantly slow down the tracking process. In yet another example, systems and methods for capturing motion in three-dimensional space disclosed in U.S. Pat. No. 9,153,028, which model a hand through geometric shape fitting against a stored database of shapes, fail in complicated cases, since not all proper shapes are available for matching. In view of the above, to overcome the shortcomings in existing technologies and advance the gesture recognition technology, it is desirable to develop fast, robust, and reliable 3D hand tracking systems and methods.

A claimed solution rooted in computer technology overcomes the problems specifically arising in the realm of computer vision. In various implementations, systems and methods are disclosed for tracking at least a portion of an object (e.g., a hand). The method may comprise training a detection model and an extraction model, capturing one or more images of at least a portion of an object, detecting the portion of the object in each of the one or more images through the trained detection model, tracking the detected portion of the object in real-time, obtaining 2D positions of one or more locations (e.g., hand joints) on the tracked portion of the object through the trained extraction model, and obtaining 3D positions of the one or more locations on the tracked portion of the object based at least in part on the obtained 2D positions. In some embodiments, the one or more images may comprise two stereo images of the portion of the object, and the two stereo images may be captured by two cameras (e.g., infrared cameras). In some embodiments, the method may further comprise subjecting the obtained 3D positions of the one or more locations (e.g., hand joints) to one or more constraints to obtain refined 3D positions of the one or more locations. The one or more constraints may comprise a normal range of each hand bone length corresponding to distances among the hand joints. In some embodiments, the method may further comprise at least one a first and a second optimization methods. The first optimization method may comprises projecting the refined 3D positions to 2D to obtain projected 2D positions, comparing the projected 2D positions with the obtained 2D positions to obtain a first difference, and adjusting the refined 3D positions to minimize the first difference, obtaining optimized 3D positions. The second optimization method may comprise comparing the refined 3D positions with the obtained 3D positions to obtain a second difference, and adjusting the refined 3D positions to minimize the second difference, obtaining optimized 3D positions.

In some embodiments, training the detection model and the extraction model may comprises various steps, such as training a detection model, refining the detection model, training an extraction model, and refining the extraction model, some of which may be optional.

Training the detection model may comprise obtaining images of various hands of different people in different postures, identifying hand positions in the obtained images according to verified hand data as a ground truth of hand, and training a first machine learning model with the obtained images and the ground truth of hand to obtain the detection model. The first machine learning model may include at least one of a random forest method or a convolution neural network (CNN) method.

Refining the detection model (that is, refining the detection model trained in the previous step) may comprise using the detection model to predict hand positions in the obtained images, and training a second machine learning model with the ground truth of hand and the predicted hand positions in the obtained images to refine the detection model. The second machine learning model may include at least one of a random forest method or a convolution neural network (CNN) method. The hand positions may refer to positions of bounding boxes defining the hand, and detecting the portion of the object in each of the one or more images through the trained detection model may comprise detecting the portion of the object in each of the one or more images through the detection model trained from at least one of the first or the second machine learning model.

Training the extraction model may comprise identifying positions of hand joints in the obtained images according to verified joint data as a ground truth of joints, using the refined detection model to obtain cropped regions of the hand, the cropped regions corresponding to the bounding boxes, and training a third machine learning model with the cropped regions of the hand and the ground truth of joints to obtain the extraction model. The third machine learning model may include at least one of a random forest method or a convolution neural network (CNN) method.

Refining the extraction model may comprise using the extraction model to predict positions of joints of the hand, and training a fourth machine learning model with the predicted positions of the joints and the ground truth of joints to refine the extraction model. The fourth machine learning model may include at least one of a random forest method or a convolution neural network (CNN) method. Obtaining the 2D positions of the one or more locations on the tracked portion of the object through the trained extraction model comprises obtaining the 2D positions of the one or more locations on the tracked portion of the object through the extraction model trained from at least one of the third or the fourth machine learning model.

In some embodiments, obtaining the 3D positions of the one or more locations on the tracked portion of the object based at least in part on the obtained 2D positions comprises obtaining the 3D positions of the one or more locations on the tracked portion of the object through a triangulation method. The triangulation method may be based at least in part on pairs of 2D joint positions from the two stereo images, focal lengths of cameras respectively capturing the two stereo images, and position information of the cameras (e.g., relative positions between the cameras, relative positions of stereo images to the cameras).

FIG. 1 is a block diagram illustrating a system 100 for 3D hand skeleton tracking, consistent with exemplary embodiments of the present disclosure. The system may include a hand skeleton tracking device 10 and an external device 104. The hand skeleton tracking device 10 may include an IR device 101, a processor 102, a display 103, and a non-transitory computer-readable storage medium 105 coupled to one another. Some of the above components may be optional, and some may be local, online, or cloud-based. For example, external device 104 may be a cloud server.

IR device 101 may comprise one or more infrared (IR) sources 1011, e.g., IR light emitting diodes, and one or more cameras 1012. One or more cameras 1012 may be selected from one or more RGB cameras, one or more depth cameras, one or more IR cameras, and a combination thereof (e.g., RGB-IR cameras, RGB-depth cameras, etc.). For example, one or more cameras 1012 may be two IR cameras, or may be an IR camera, a RGB camera, and a depth camera. One or more cameras 1012 may capture RGB information, depth information, and/or IR information of an object or a portion of an object and transmit such information to processor 102. Processor 102 may process the information and output results to display 103 for rendering. Processor 102 may be connected to external device 104 through internet. An administrator or data labeler may be able to configure processor 102 through operations from external device 104.

Non-transitory computer-readable storage medium 105 may couple to processor 102 and may store instructions that, when executed by processor 102, perform the method(s) or step(s) described below. The instructions may be specialized and may include various machine learning models, inverse kinetics (IK) models, and/or other models and algorithms described in the present disclosure. In order to perform the steps or methods described below, processor 102 and/or the instructions (e.g., the machine learning models, inverse kinetics methods, other models or algorithms, etc.) may be specially trained. Corresponding training processes are described below with reference to various steps and figures.

In some embodiments, the above components of system 100 may have many configurations. For example, IR device 101, processor 102, and display 103 may be integral parts of a single device, such as a mobile device. For another example, IR device 101 can be connected wirelessly or by wire to a PC or mobile device comprising processor 102 and display 103. For yet another example, processor 102, display 103, and/or non-transitory computer-readable storage medium 105 may be disposed on external device 104.

Figure 2:
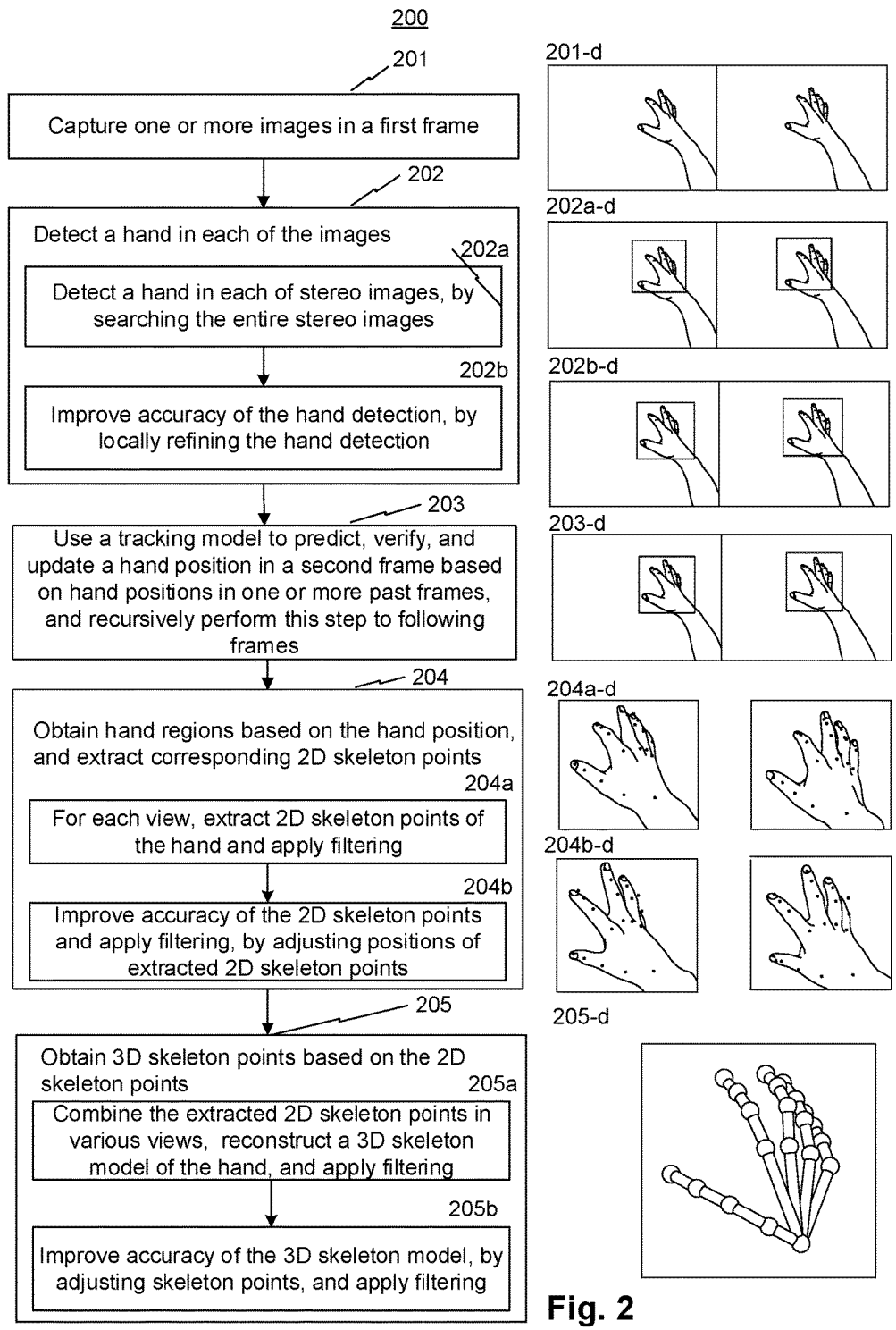
FIG. 2 is a flow diagram illustrating a method for 3D hand skeleton tracking, consistent with exemplary embodiments of the present disclosure.

FIG. 2 is a flow diagram illustrating a method 200 for 3D hand skeleton tracking, consistent with exemplary embodiments of the present disclosure. Method 200 may include a number of steps and sub-steps, some of which may be optional. For example, step 202 may comprise both sub-steps 202a and 202b or may comprise only sub-step 202a, step 204 may comprise both sub-steps 204a and 204b or may comprise only sub-step 204a, and step 205 may comprise both sub-steps 205a and 205b or may comprise only sub-step 205a. Each step or sub-step is associated with one or more images on its right to illustrate the corresponding effect. For example, step 201 is associated with image 201-*d*, which comprises two stereo images of a hand. The stereo images may be or may be converted to grey scale images, black-and-white images, etc. Method 200 may be implemented by one or more components of system 100, such as hand skeleton tracking device 10.

In some embodiments, system 100 may store and train one or more machine learning models in advance to perform certain steps or sub-steps described below. For example, system 100 may store an algorithm as instructions in non-transitory computer-readable storage medium 105, and the stored algorithm is not explicitly programmed to solve a specific task. Through training, system 100 may receive predetermined training data to recognize data patterns, learn from the recognized patterns, and improve an model based on the learning, so that system 100 can perform the specific task based on the improved model. The model may be a part of the stored instructions. For example, the training data may comprise example inputs and their desired outputs, and the goal is for the model to learn a general rule that maps the inputs to the outputs. The model may self-reinforce a correct rule and self-improve on an incorrect rule. Exemplary machine learning models may be provided below with reference to various steps.

At step 201, system 100 may capture one or more images in a first frame. In some embodiments, IR device 101 may include two IR cameras configured to capture stereo images of a hand, e.g., a first IR camera capturing a left image of a hand and a second IR camera capturing a right image of the same hand as illustrated in image 201-*d*.

At step 202, system 100 may detect the hand in each of the images, e.g., detect the hand from the stereo images by a machine learning model. The machine learning model may include a random forest method, a convolution neural network (CNN) method, etc. Through the machine learning model, the hand detection can be more stable and accurate, without any pre-process step. In some embodiments, the one or more images may be analyzed by the same model to detect the hand.

In some embodiments, step 202 may comprise sub-steps 202a and 202b.

At step 202a, system 100 may detect a hand in each of the stereo images (the detection is shown as a bounding box identifying a hand in image 202a-*d*) by searching through the entire stereo images. In some embodiments, system 100 may be trained according to method 300b described below with reference to FIG. 3B to perform sub-step 202a.

At sub-step 202b, system 100 may improve accuracy of the hand detection by locally refining the hand detection. As shown in image 202b-*d*, each bounding box includes more complete portions of the hand as compared to that in image 202a-*d*. In some embodiments, each of the stereo images may be analyzed by a corresponding model to achieve the refined hand detection. In some embodiments, system 100 may be trained according to method 300c described below with reference to FIG. 3C to perform sub-step 202b. In some embodiments, system 100 may use a machine learning model including, for example, a random forest method and a CNN method, to perform sub-steps 202a and 202b. In some embodiments, the sub-step 202a and 202b may use the same machine learning model. In some other embodiments, the sub-step 202a and 202b may use different machine learning models. For example, sub-step 202a uses a random forest method and sub-step 202b uses a CNN method, or vice versa.

At step 203, system 100 may predict, verify, and update a hand position in a second frame (illustrated in image 203-*d*) based on hand positions in one or more past frames (e.g., the first frame) and may recursively perform the prediction-verification-update step to following frames. In some embodiments, system 100 may use a tracking model or strategy to perform step 203. The tracking model or strategy may include variations of Particle Swarm Optimization (PSO), Particle Filter, Kalman Filter, extended Kalman Filter, Markov Chain Method, Monte Carlo Method, and other smoothing filters. In some embodiments, system 100 may perform steps 201-202 for a predetermined number of frames before performing step 203. Step 203 may allow consistent detection of the same hand across different frames.

Figure 4:
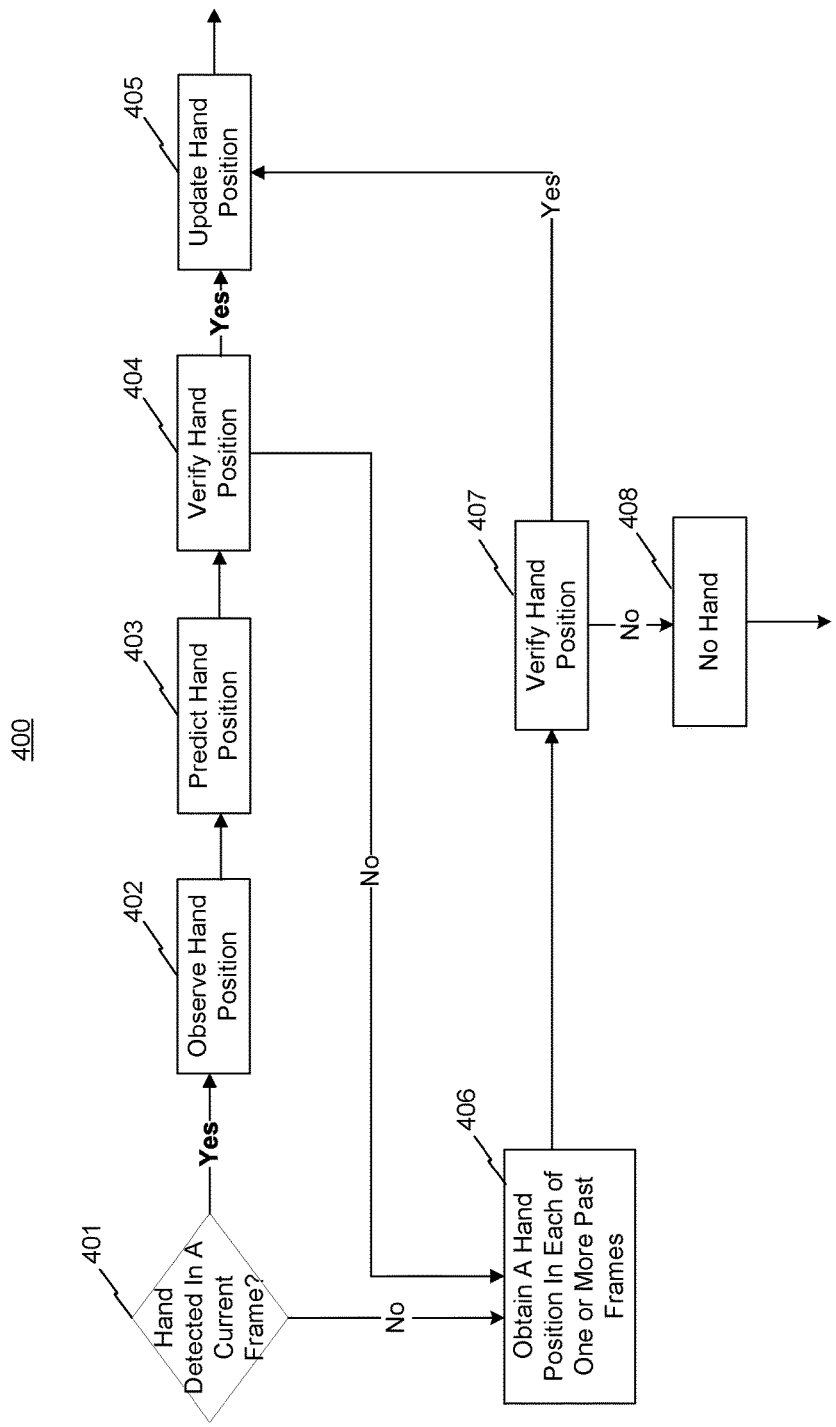
FIG. 4 is a flow diagram illustrating sub-steps of steps 202-203, consistent with exemplary embodiments of the present disclosure.

Referring to FIG. 4, FIG. 4 is a flow diagram illustrating sub-steps of steps 202-203, consistent with exemplary embodiments of the present disclosure. Some of the sub-steps (e.g., sub-steps 402 and 403) may be interchangeable. Some of the sub-steps may be optional. At sub-step 401, system 100 may determine if a hand is detected in a current frame (e.g., the second frame). If the hand is detected, the method proceeds to sub-step 402. If the hand is not detected, the method proceeds to sub-step 406. At sub-step 402, system 100 may determine an observed position of the hand. In some embodiments, sub-step 402 may correspond to step 202, and sub-steps 403-408 may correspond to step 203. At sub-step 403, system 100 may predict a position of the hand in the current frame. In some embodiments, system 100 may obtain hand positions in one or more past frames, feed the positions of the one or more past frames to a physical model (e.g., a free motion physics model), and obtain the predicted position based on the model output. The predicted position may include uncertainties and associated weights. At sub-step 404, system 100 may compare the observed position and the predicted position to verify the hand position. If a difference of the comparison is above a predetermined threshold, the method may proceed to sub-step 406. If the difference is not above the predetermined threshold, the method may positively verify the observed hand and proceed to sub-step 405. At sub-step 405, system 100 may update the observed position based on the predicted position and the verification. At sub-step 406, system 100 may obtain a hand position in each of one or more past frames. At sub-step 407, system 100 may compare the hand position(s) in the one or more past frames and the predicted position(s), or may compare the hand position(s) in the one or more past frame(s) and the observed position(s). If the comparison from sub-step 407 is above a predetermined threshold, the method may proceed to sub-step 408, and system 100 may determine that no hand is detected in the current frame. If the comparison from sub-step 407 is not above a predetermined threshold, the method may proceed to sub-step 405. In some embodiments, system 100 may recursively perform sub-steps 401-408 on a number of frames based on one or more past frames.

Referring back to FIG. 2, at step 204, system 100 may obtain hand regions based on the hand position for each view (e.g., hand positions as defined by the bounding boxes), and extract corresponding 2D skeleton points of the hand for each view. The hand position in step 204 may be directly obtained from sub-step 202a or 202b, or step 203, while skipping the other steps. The skeleton points can represent skeleton positions of the hand.

In some embodiments, step 204 may comprise sub-steps 204a and 204b. At sub-step 204a, system 100 may use a bounding box to obtain a hand region identifying the hand in each view, extract corresponding skeleton points (illustrated in image 204a-d), and apply filtering. The applied filter(s) may include Kalman Filter, extended Kalman Filter, Mean Filter, Medium Filter, etc. In some embodiments, system 100 may be trained according to method 300d described below with reference to FIG. 3D to perform sub-step 204a.

Figure 5:
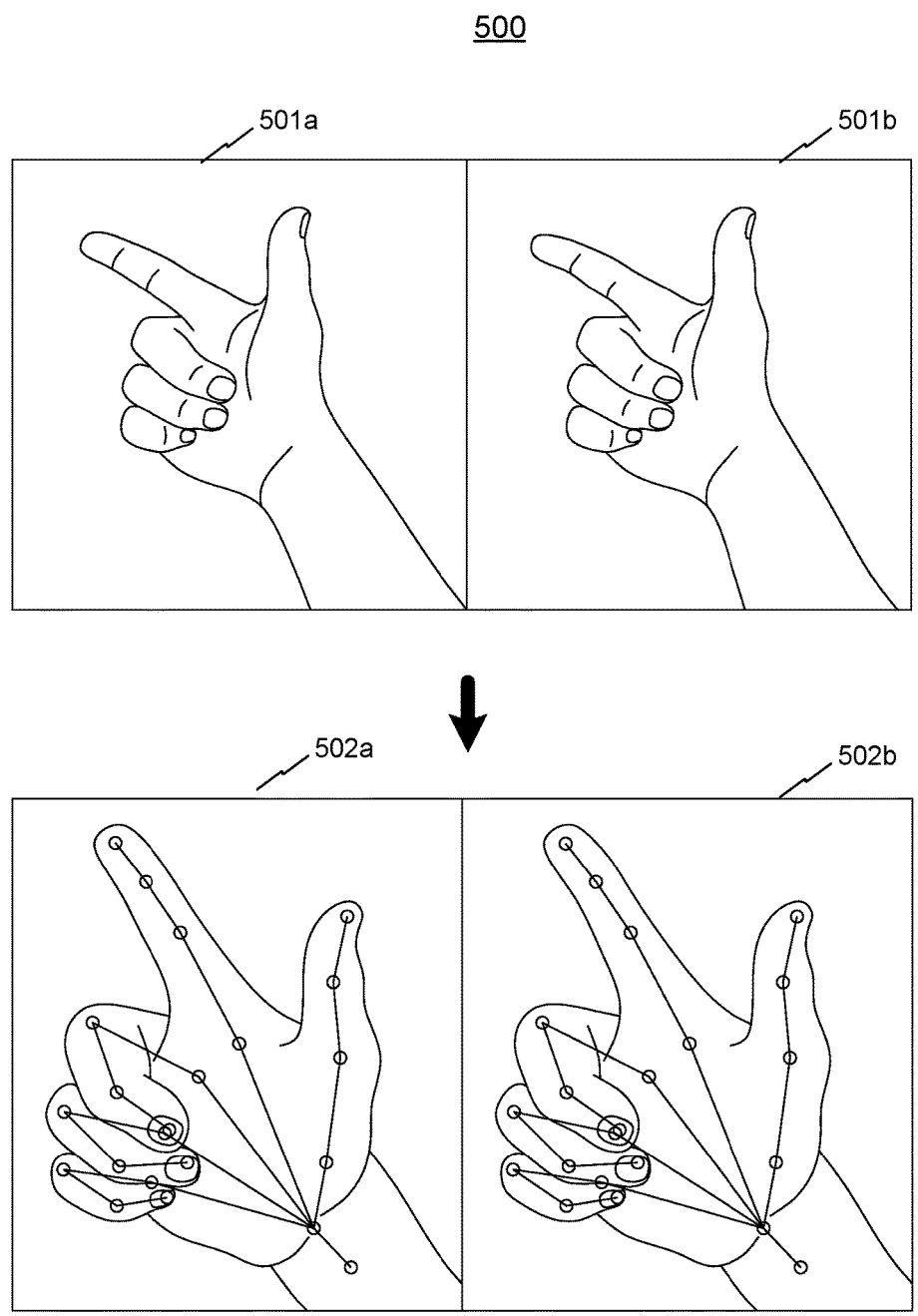
FIG. 5 is a graphical representation illustrating sub-step 204a, consistent with exemplary embodiments of the present disclosure.

Referring to FIG. 5, FIG. 5 is a graphical representation 500 of sub-step 204a, consistent with exemplary embodiments of the present disclosure. In some embodiments, system 100 may combine two stereo images of hand regions 501a and 501b into one image (not shown in the figure) and extract skeleton points in each view. For example, system 100 may extract position points of 22 hand joints as shown in image 502a or image 502b. Image 502a and image 502b may be the same image. The extracted position points may also include corresponding confidence levels of the points. Each confidence level may indicate a probability of the extracted position being a true position and may be outputted by a trained model described below with reference to FIG. 3D. Combining the hand regions into one image may improve accuracy of the hand position, especially when the images contain occlusions.

Referring back to FIG. 2, at sub-step 204b, system 100 may improve the accuracy of the skeleton points, by adjusting positions of the extracted 2D skeleton points (illustrated in image 204b-d). Sub-step 204b can adjust the skeleton points to more accurate positions such that, for example, skeleton points along the same finger fall on a smooth line or curve. In some embodiments, system 100 may be trained according to method 300e described below with reference to FIG. 3E to perform sub-step 204b. In some embodiments, system 100 may use a machine learning model including, for example, a random forest method and a CNN method, to perform sub-steps 204a and 204b. In some embodiments, the sub-step 204a and 204b may use the same machine learning model. In some other embodiments, the sub-step 204a and 204b may use different machine learning models. For example, sub-step 204a uses a random forest method and sub-step 204b uses a CNN method, or vice versa.

Figure 6:
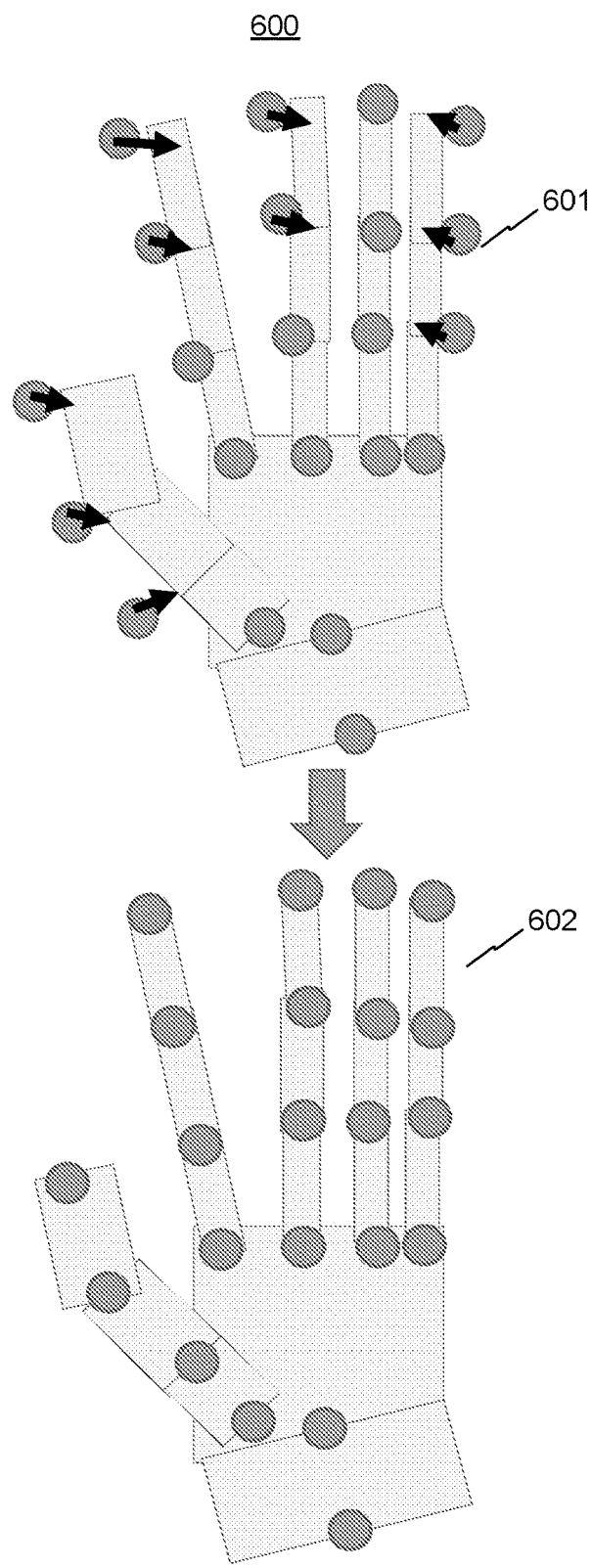
FIG. 6 is a graphical representation illustrating sub-step 204b in one view, consistent with exemplary embodiments of the present disclosure.

Referring to FIG. 6, FIG. 6 is a graphical representation 600 of sub-step 204b in one view, consistent with exemplary embodiments of the present disclosure. In some embodiments, system 100 may predict positions of skeleton points with corresponding confidence levels in a current frame, e.g., position of hand joints. After obtaining the extracted skeleton positions at step 204a, system 100 may compare the predicted positions with the extracted skeleton positions to estimate an offset to true skeleton positions at step 204b. The offset can be represented by arrows shown in configuration 601. Thus, system 100 may update the skeleton point positions based on the offset to obtain configuration 602.

Referring back to FIG. 2, at step 205, system 100 may obtain 3D skeletons points representing the hand (illustrated in image 205-d) by the IK model based on the 2D skeleton points. The 2D skeleton points described in step 205 may be obtained directly from sub-step 204a or 204b. The obtained 3D skeleton model and associated data can be tracked in real time and can be directly used in applications. By the IK model, system 100 can obtain a realistic and accurate 3D hand model, satisfying human bone-joint constraints such as bone lengths and joint angles. The 3D hand model may also contain detailed information of the tracked hand, including the 3D positions and orientations of each joint and each fingertip, the length and orientation of each bone, and the hand size, e.g., the hand width and length.

In some embodiments, the IK model may include solving a non-linear equation, e.g., optimizing an observation function with respect to a 26 degrees of freedom (DoF) skeleton model:

$$\text{Error} = Y - F(X, \theta)$$

$Y = (y_1, y_2, \ldots, y_n)$ represents a set of 2D or 3D positions of all joints from a previous module; F represents a function (e.g., a skeleton model function) of X and $\theta$; $X = (x_1, x_2, \ldots, x_m)$ represents a set of variables in the skeleton model; and $\theta$ represents a set of parameters in the skeleton model, such as bone lengths of bones in a normal hand. This non-linear equation may be applied to the hand joints described in FIG. 7A.

Figure 7A:
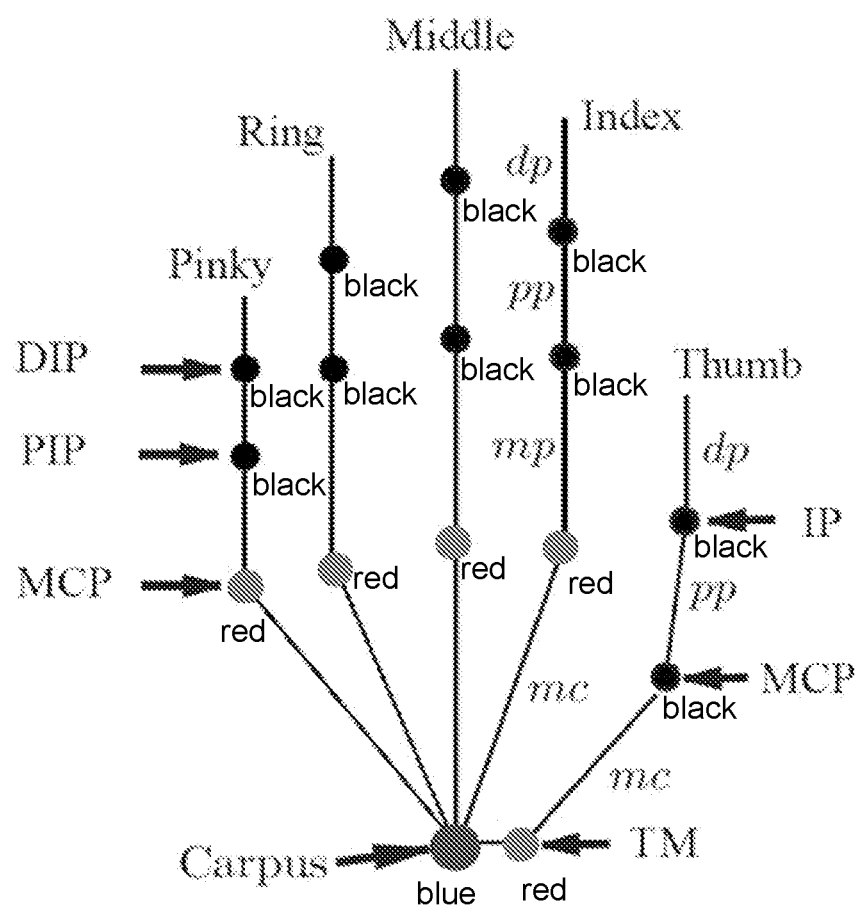
FIG. 7A is a graphical representation illustrating a hand skeleton model, consistent with exemplary embodiments of the present disclosure.

Referring to FIG. 7A, FIG. 7A is a graphical representation of a hand skeleton model. In some embodiments, a root, as represented by a blue point, has six DoF, including three types of rotations and three types translations; red joints each have two DoF, including rotations around the z and x axes; and black joints each have one DoF, including a rotation around the x axis. Thus, all hand joints add up to 26 DoF. Subject to the 26 DoF, optimizing the non-linear equation may identify the set of variables X that best describe the hand joint positions. Details of the optimization are described below with reference to FIG. 7B.

Figure 7B:
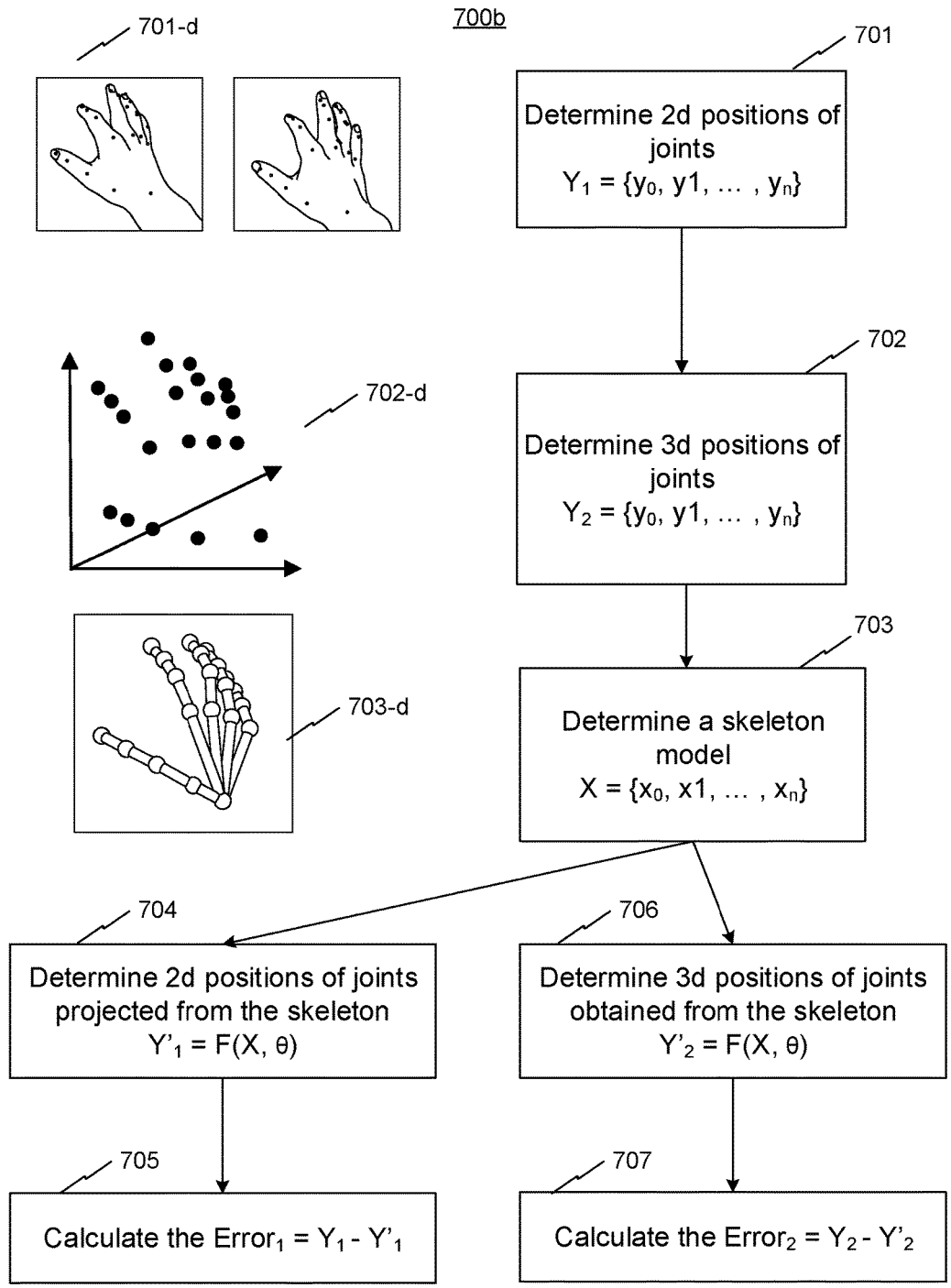
FIG. 7B is a flow diagram illustrating an Inverse Kinematics (IK) model, consistent with exemplary embodiments of the present disclosure.

Referring to FIG. 7B, FIG. 7B is a flow diagram 700b illustrating the IK model, consistent with exemplary embodiments of the present disclosure. At step 701, system 100 may determine 2d positions of joints $Y_1=\{y_0, y_1, \ldots, y_n\}$. Step 701 may be similar to step 204 described above. An exemplary result of step 701 is illustrated in image 701-d. Steps 702-707 may be similar to step 205a and/or 205b described below.

At step 702, system 100 may determine 3d positions of joints $Y_2=\{y_0, y_1, \ldots, y_n\}$ by a 2D-3D reverse projection. The 2D-3D reverse projection may also be known as 3D reconstruction or triangulation, which may be simplified to determining a point in 3D space given its projections into two or more images. In the scenario of the two cameras capturing an object described above, each point of the object may correspond to a line captured by the left camera in the left image and another line captured by the right camera in the right image. The end of the lines on the left and right images forming a pair of points corresponding to the point on the object. The pair of points have known positions relative to the image and to the camera. That is, the pair of points in the left and right images are the projection of a common 3D point. Conversely, the set of lines generated by pairs of images points can intersect at the common 3D point. To identify the common 3D point from an image point pair, a number of methods may be used. For example, provided that image point pairs are identified, for each camera, its focal point and an image point of the image point pair can determine a straight line in the 3D space. By projecting the two straight lines in 3D and based on relative positions of the two cameras, the intersection of the projected lines may be determined as the common 3D point relative to the cameras. In practice, various types of noise, such as geometric noise from lens distortion or interest point detection error may need to be taken account to accurately determine the common 3D point. An exemplary result of step 702 is illustrated in image 702-d.

At step 703, system 100 may determine a skeleton model $X=\{x_0, x_1, \ldots, x_n\}$ based on the determined 3d positions of joints $Y_2=\{y_0, y_1, \ldots, y_n\}$, for example, by subjecting $Y_2=\{y_0, y_1, \ldots, y_n\}$ to a set of parameters $\delta=\{\theta_0, \theta_1, \ldots, \theta_n\}$. As described above with reference to the non-linear function, θ represents a set of parameters in the skeleton model, such as bone lengths of bones in a normal hand. An exemplary result of step 703 is illustrated in image 703-d.

Steps 704 and 705 may be referred to as a first optimization method. The first optimization method may comprise projecting the refined 3D positions to 2D to obtain projected 2D positions, comparing the projected 2D positions with the obtained 2D positions to obtain a first difference, and adjusting the refined 3D positions to minimize the first difference, obtaining optimized 3D positions. At step 704, system 100 may project the skeleton model from 3D to 2D to obtain $Y'_1=F(X, \theta)$, so that at step 705, system 100 may calculate the $Error_1=Y_1-Y'_1$.

Steps 706 and 707 may be referred to as a second optimization method. The second optimization method may comprise comparing the refined 3D positions with the obtained 3D positions to obtain a second difference, and adjusting the refined 3D positions to minimize the second difference, obtaining optimized 3D positions. At step 706, system 100 may determine 3d positions of joints $Y'2=F(X, \theta)$ based on the (refined) skeleton model, so that at step 707, system 100 may calculate the $Error_2=Y_2-Y'_2$. By minimizing $Error_1$ and/or $Error_2$, system 100 can obtain the optimized 3D skeleton points $X=\{x_0, x_1, \ldots, x_n\}$ representing the hand in the skeleton model.

Referring back to FIG. 2, in some embodiments, step 205 may comprise sub-steps 205a and 205b. Each of the sub-steps 205a and 205b may implement an IK model as discussed above.

At sub-step 205a, system 100 may combine the extracted 2D skeleton points in various views from sub-step 204a or 204b to reconstruct a 3D skeleton model of the hand, and apply filtering. The applied filter or filters may include Kalman Filter, extended Kalman Filter, Mean Filter, Medium Filter and the like. In some embodiments, the 3D skeleton model may include 16 joints' 3D positions and 3D orientations (16 joints are shown are black, red, or blue in FIG. 7A), 5 finger tips' 3D positions and 3D orientations, and a wrist's position and orientation.

At sub-step 205b, system 100 may improve accuracy of the 3D skeleton model by adjusting skeleton points, and apply filtering. The applied filter or filters may include Kalman Filter, extended Kalman Filter, Mean Filter, Medium Filter and the like.

In some embodiments, various methods may be used to implement step 205a and 205b. A first method may correspond to steps 701-703, 706, and 707 described above with reference to FIG. 7B, where step 701 may correspond to step 204, steps 702 and 703 may correspond to sub-step 205a, and steps 706 and 707 may correspond to sub-step 205b. In the first method, to reconstruct the 3D skeleton model, system 100 may first convert the extracted 2D skeleton points, e.g., skeleton joints in the left and right stereo images, into 3D points by a geometric 2D to 3D reverse projection method (also known as 3D construction or triangulation), and use the reversely projected 3D points as observed joints positions Y. The reverse projection may include determining a 3D location of a point by forming a triangle to it from two known points, such as the corresponding points in the two captured 2D images. With known image parameters such as focal lengths, camera positions, and wide angles of the cameras, the 3D location can be calculated. Since Function $F(X, \theta)$ uses a 26 DoF variable X to obtain 3D positions of the joints, system 100 can minimize total 3D positional differences between the 3D points in Y and the 3D points in Function $F(X, \theta)$ by changing the values of X based on an optimization method subject to constraint θ. The optimization method may include gradient descent, Gauss-Newton algorithm, Levenberg-Marquardt algorithm, etc. The constraints may relate to one or more variables and may require, for example, each joint angle represented in X to be within a predetermined range, two joints angles represented in X to be correlated, and consistency between frames. The Error function may include a difference between a current result X(t) and a result X(t−1) in a previous frame, and the constraints may require the difference to be smaller than a predetermined threshold to ensure a smooth tracked motion. Upon optimization, system 100 may obtain new optimal skeleton variables X' and parameter θ'.

A second method may correspond to steps 701-705 described above with reference to FIG. 7B, where step 701 may correspond to step 204, steps 702 and 703 may correspond to sub-step 205a, and steps 704 and 705 may correspond to sub-step 205b. In the second method, system 100 may directly use the extracted 2D skeleton points, e.g., skeleton joints in the left and right stereo images, as observed joints positions Y. System 100 may use Function $F(X, \theta)$ and 26 DoF variable X to calculate 3D positions of the skeleton joints from the left and right stereo images, and project the calculated 3D points to 2D points in the coordinate system of the left and right stereo images. System 100 may minimize total 2D positional differences between the 2D points in Y and the 2D points in Function F(X, θ) by changing the values of X and θ based on an optimization method subject to constraints. The optimization method may include gradient descent, Gauss-Newton algorithm, Levenberg-Marquardt algorithm, etc. The constraints may relate to one or more variables and may require, for example, each joint angle represented in X to be a predetermined range, two joints angles represented in X to be correlated, and consistency between frames. The Error function may include a difference between a current result X(t) and a result X(t−1) in a previous frame, and the constraints may require the difference to be smaller than a predetermined threshold to ensure a smooth tracked motion. Upon optimization, system 100 may obtain new optimal skeleton variables X' and parameter θ'.

FIGS. 3A-3E are flow diagrams illustration various training methods of system 100 for 3D hand skeleton tracking, consistent with exemplary embodiments of the present disclosure. The training methods may be stored in system 100, e.g., in storage medium 105. In some embodiments, system 100, e.g., processor 102 and/or storage medium 105, are specially trained to perform various steps of method 200 described above.

System 100 or a component of system 100, such as external device 104, may perform the (training) methods described with reference to FIGS. 3A-3E. In some embodiments with respect to an off-line training mode, external device 104 performs methods and steps described with reference to FIGS. 3A-3E to obtain a trained model and exports the trained model to hand skeleton tracking device 10 for applications. The off-line training mode may include batch training and learning to generate the best predictor by learning on an entire available training data set at once. In some other embodiments with respect to an on-line training mode, external device 104 may train hand skeleton tracking device 10 in real time. The on-line training mode may include using data that becomes available in a sequential order to update or train the best predictor for future data at each step. Descriptions below may be based on the off-line training mode.

Figure 3A:
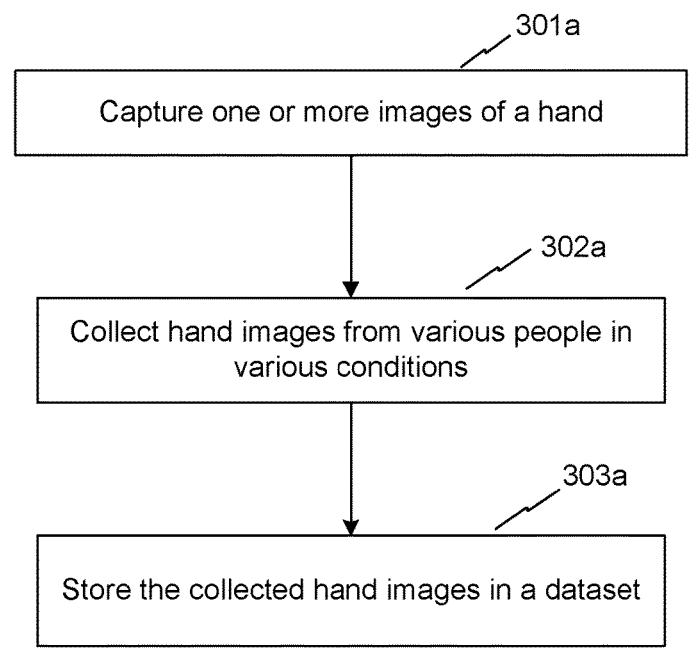
FIGS. 3A-3E are flow diagrams illustrating various training methods of system 100 for 3D hand skeleton tracking, consistent with exemplary embodiments of the present disclosure.

Referring to FIG. 3A, system 100 may perform method 300a to prepare for methods 300b-300e described below. At step 301a, system 100 may capture one or more images of a hand. At step 302a, system 100 may obtain the captured hand images from various people in various conditions. At step 303a, system 100 may store the collected hand images in a dataset in storage medium 105.

Figure 3B:
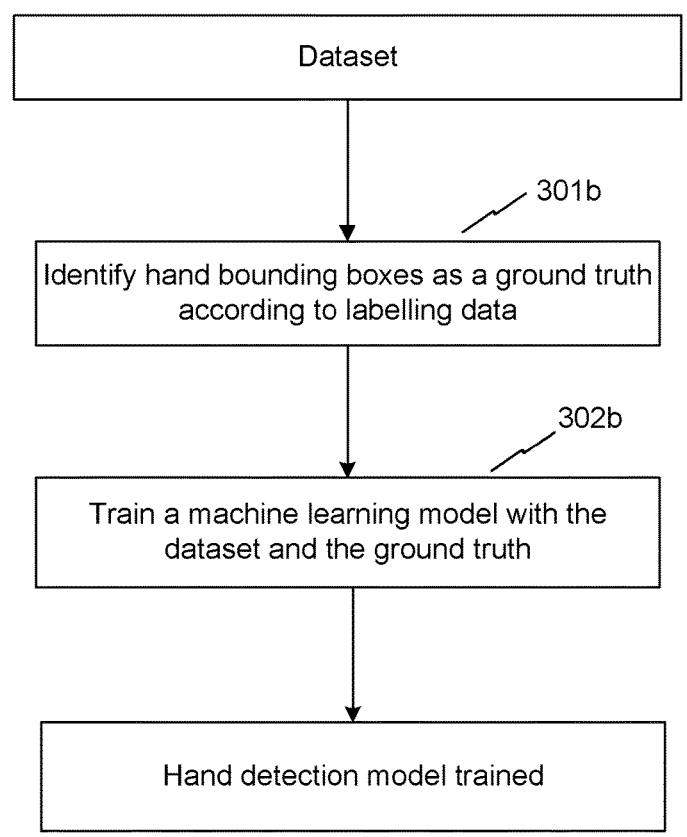

Referring to FIG. 3B, a detection model of system 100 may be trained according to method 300b to perform substep 202a described above with reference to FIG. 2. At step 301b, system 100 may identify hand bounding boxes on hand images as a ground truth of hand according to labeling data. The hand image may be in the dataset obtained from method 300a. In some embodiments, the labeling data may be regions of hands in images labeled by an administrator or a verified dataset with images of hands labeled by bounding boxes. In some embodiments, the images of the hands for obtaining the ground truth may be camera-captured. In some other embodiments, the images of the hands for obtaining the ground truth may be computer-generated. At step 302b, system 100 may train a machine learning model with the dataset and the ground truth to obtain a hand detection model. The machine learning model may include a random forest method, a convolution neural network (CNN) method, etc. System 100 may also update the dataset to include the trained hand detection model. This machine learning model may be referred to as the first machine learning model.

In one example of using the CNN method, system 100 may convert each image (e.g., grey scale image) to an intensity array. The array may be organized in pixel tiles. System 100 may apply layers of analysis to each of the tiles to recognize the hand position. The layers of tiles may include, for example, a convolution layer, a pooling layer, etc. Each layer may gradually improve the recognition, for example, a first layer may recognize sharp edges, a second layer may recognize fingers and palm, etc. Overall, a large image can be boiled down layer by layer to recognize the hand position (or joint position as applied to later applications). For the training, system 100 may receive the ground truth, analyze the intensity array, and associate the intensity array configuration with the hand location according to the ground truth. For the prediction, system 100 may determine the hand position based on the trained model.

Figure 3C:
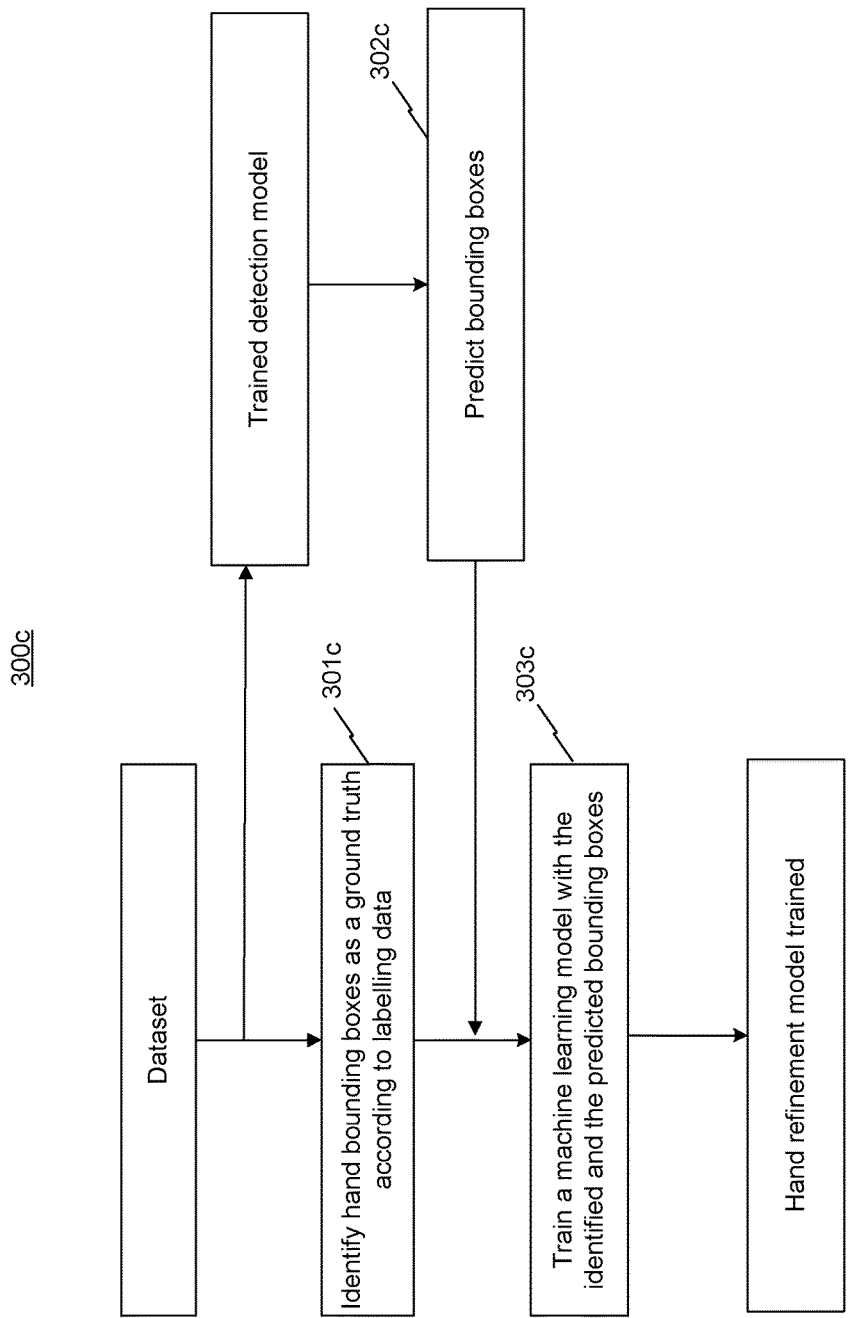

Referring to FIG. 3C, a refined detection model of system 100 may be trained according to method 300c to perform sub-step 202b described above with reference to FIG. 2. At step 301c, system 100 may identify hand bounding boxes based on hand image dataset of method 300a, as the ground truth of hand according to labeling data. In some embodiments, the labeling data may be regions of hands in images labeled by an administrator or a verified dataset with images of hands labeled by bounding boxes. At step 302c, system 100 may predict bounding boxes of the hand using the hand detection model of method 300b. At step 303c, system 100 may train a machine learning model with the identified and the predicted bounding boxes to obtain a hand refinement model. The trained hand refinement model may be included in the dataset. The machine learning model may include a random forest method, a convolution neural network (CNN) method, etc. This machine learning model may be referred to as the second machine learning model. System 100 may also update the dataset to include the trained hand refinement model.

In one example of using the random forest method, the predicted hand position may be verified based at least in part on the ground truth. A random forest may comprise multiple decision trees that collectively determine whether the hand position is verified. For example, if a number of trees over a threshold can verify the hand position, the predicted hand position can be used to update the hand position; otherwise, system 100 may look into previous hand positions. Each tree may be designed with node splits and be trained with the ground truth. An exemplary node split may depend on the horizontal pixel position. Thus, the model may enhance the accuracy of the hand position.

Figure 3D:
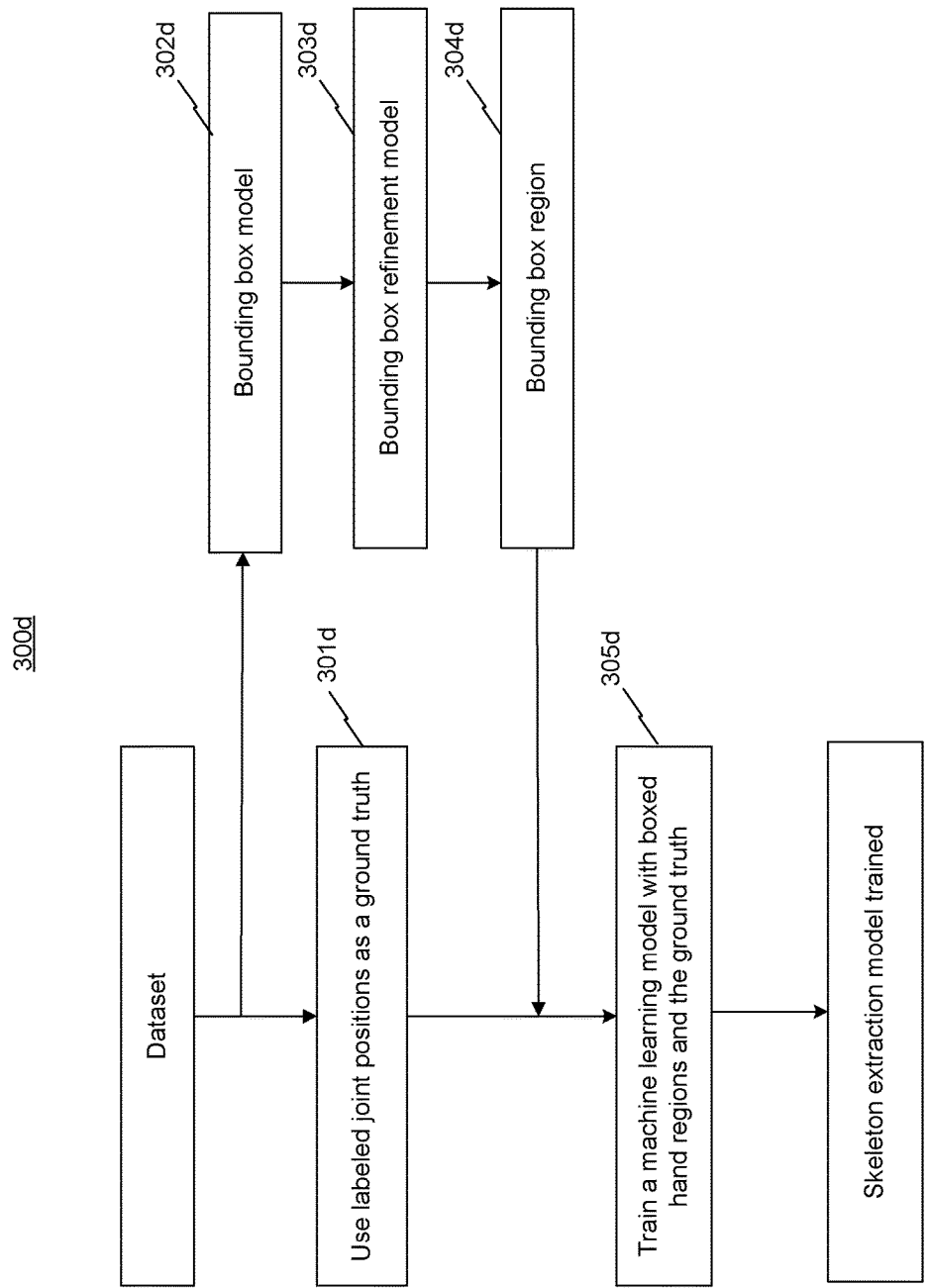

Referring to FIG. 3D, an extraction model of system 100 may be trained according to method 300d to perform sub-step 204a described above with reference to FIG. 2. At step 301d, system 100 may use labeled joint positions from the dataset as a ground truth of joints. The labeled joint positions may also include corresponding probabilities based on one or more factors such as position distinguishability in one frame and consistency between frames. For example, if a joint is clearly distinguishable, the probability of its labeled position may be 1. For another example, if a joint is clearly hidden behind another object or not clearly distinguishable, the probability of its labeled position may be 0.5. For yet another example, if labeled positions of a joint are similar in 10 consecutive frames, the corresponding probabilities may be close to 1. At step 302d, system 100 may train a bounding box model with the ground truth of hand from the dataset.

The bounding box model may be similar to the hand detection model described above with reference to FIG. 3B. At step 303d, system 100 may train a bounding box refinement model with results from step 302d. The bounding box refinement model may be similar to the hand refinement model described above with reference to FIG. 3C. At step 304d, system 100 may extract boxed hand regions from results of step 303d, for example, by using the refined detection model to obtain cropped regions of the hand. At step 305d, system 100 may train a machine learning model with the boxed hand regions and the ground truth of joints to obtain a skeleton extraction model. The machine learning model may include a random forest method, a convolution neural network (CNN) method, etc. The machine learning model may be referred to as a third machine learning model. Since the bounding box model and bounding box refinement model are trained with labeled positions with corresponding probabilities, outputs of the models may include positions with corresponding probabilities such as, for example, a confidence level of an outputted position being a true position.

Figure 3E:
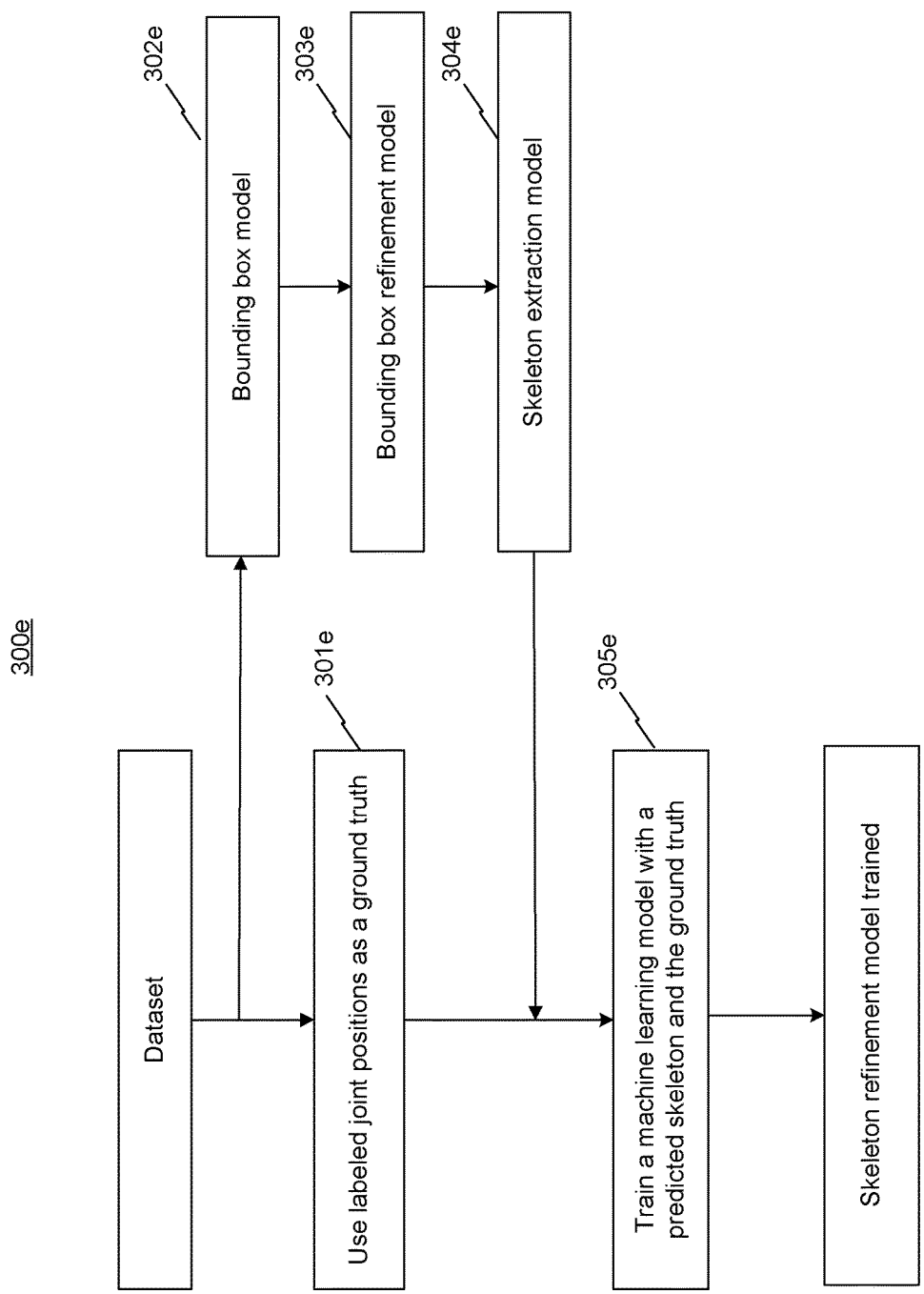

Referring to FIG. 3E, a refined extraction model of system 100 may be trained according to method 300e to perform sub-step 204b described above with reference to FIG. 2. At step 301e, system 100 may use labeled joint positions from the dataset as a ground truth. At step 302e, system 100 may train a bounding box model with the ground truth of hand from the dataset. The bounding box model may be similar to the hand detection model described above with reference to FIG. 3B. At step 303e, system 100 may train a bounding box refinement model with results from step 302e. The bounding box refinement model may be similar to the hand refinement model described above with reference to FIG. 3C. At step 304e, system 100 may use a skeleton extraction model, e.g., the trained skeleton extraction model of method 300d, to predict a skeleton of the hand based on results from step 303e. At step 305e, system 100 may train a machine learning model with the predicted skeleton and the ground truth of joints to obtain a skeleton refinement model. The machine learning model may include a random forest method, a convolution neural network (CNN) method, etc. The machine learning model may be referred to as a fourth machine learning model.

Figure 8:
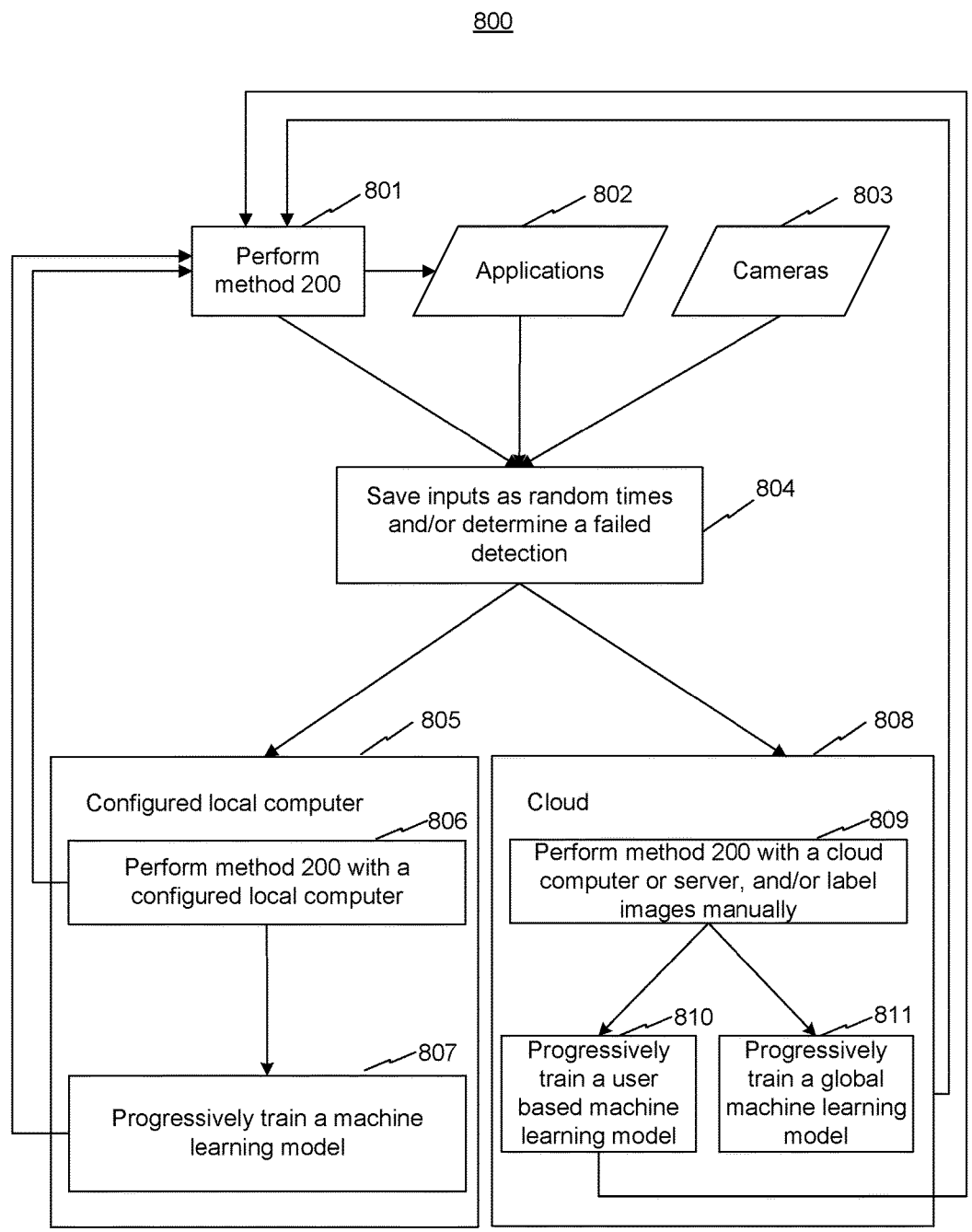
FIG. 8 is a flow diagram illustrating a method for 3D hand skeleton tracking, consistent with exemplary embodiments of the present disclosure.

FIG. 8 is a flow diagram illustrating a method 800 for 3D hand skeleton tracking, consistent with exemplary embodiments of the present disclosure. Method 800 may comprise a number of steps and sub-steps, some of which may be optional.

At step 801, system 100 may perform method 200 described above with reference to FIG. 2 and generate corresponding results, e.g., the 3D hand model. At step 802, applications may receive the results from step 801, and generate corresponding results. At step 803, cameras may capture images. At step 804, system 100 may receive inputs from steps 801, 802, and/or 803, save the inputs at random times, and/or determine a failed detection. System 100 may determine a detection as a failed detection if (a) a user has difficulty to complete application specific interaction tasks, (b) any step of method 200 reports a low confidence level, e.g., a statistical confidence level or a probability of an output is lower than 70% of being correct, or (c) the IK model reports an error above a predetermined threshold. After determining a failed detection, System 100 may save corresponding inputs and send them to a configured local computer at step 805 or to a cloud computer or server at step 808.

In some embodiments, method 200 is performed, at a fast and interactive speed, by a local computer, e.g., a cell phone, of system 100 storing a set of algorithms. System 100 may also store copies of similar algorithms in a configured local computer and/or a cloud computer or server to perform corresponding methods. The configured local computer, cloud computer, or cloud server may have increasingly more computer powers to perform corresponding methods. For example, a configured local computer may perform method 200 faster than a cellphone. For another example, a cloud computer may perform method 200 for more cycles than a cellphone and obtain more accurate results. For yet another example, a cloud server may perform a modified method 200 with a more complex machine learning model and obtain more accurate results.

In some embodiments, step 805 may comprise sub-steps 806 and 807. At sub-step 806, system 100 may perform method 200 or a method similar to method 200 at a configured local computer and output labeled data to sub-step 807. The local computer may be configured to run occasionally in the background, e.g. when the computer is idle. At sub-step 807, system 100 may progressively train a machine learning model (e.g., the (refined) detection and/or the (refined) extraction model) based on results of sub-step 806. By performing sub-steps 806 and 807, system 100 can determine characteristics user's hands as personal parameters to improve the performance of method 200, use more accurate result as labeled data to further improve the machine learning models, and generate user-specific models. System 100 can send improved results, e.g., improved machine learning models and model parameters from step sub-806 or 807, to step 801 to update method 200.

In some embodiments, step 808 may comprise sub-steps 809-811. At sub-step 809, system 100 may receive usage data, e.g., failed detections, from step 804. System 100 may perform method 200 or a method similar to method 200 at a cloud computer or server. System 100 may detect the hand, label the hand as training data, allow manual inspection or labeling of the data, and send the labeled data to sub-step 810 or 811. At sub-step 810, system 100 may use the labeled data to improve a user specific machine learning model (e.g., the (refined) detection and/or the (refined) extraction model). At sub-step 811, system 100 may use the labeled data to improve a global machine learning model (e.g., the (refined) detection and/or the (refined) extraction model). System 100 can send improved results, e.g., the improved machine learning model and model parameters from sub-step 810 or 811, to step 801 to update method 200.

The methods described herein can be applied on, but limited to, a hand. In some embodiments, other limbs or body parts can be captured and corresponding skeleton points can be similarly tracked by the systems and methods described in this disclosure. With a dedicated stereo camera system, the methods described above can detect and track the hand skeleton in 3D, based on a combination of machine learning, inverse kinematics, per-person model, off-line learning, and cloud learning. The disclosed methods are fast, robust, and accurate, and work well with hands of various sizes, aspect ratios, and shapes. The systems and methods described above can be integrated in a mobile device, and can be applied in virtual reality (VR) and augment reality (AR) with the disclosed stereo imaging system.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processors (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for 3D hand skeleton tracking. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A tracking system, comprising:
a processor; and
a non-transitory computer-readable storage medium coupled to the processor and storing instructions that, when executed by the processor, cause the system to perform:
training a detection model and an extraction model, comprising:
obtaining images of various hands of different people in different postures,
identifying hand positions in the obtained images according to verified hand data as a ground truth of hand,
training a first machine learning model with the obtained images and the ground truth of hand to obtain the detection model,
using the detection model to predict hand positions in the obtained images, and
training a second machine learning model with the ground truth of hand and the predicted hand positions in the obtained images to refine the detection model;
capturing one or more images of at least a portion of an object, wherein the portion of the object comprises a hand;
detecting the portion of the object in each of the one or more images through the trained detection model;
tracking the detected portion of the object in real-time;
obtaining 2D positions of one or more locations on the tracked portion of the object through the trained extraction model, wherein the one or more locations comprise one or more joints of the hand; and
obtaining 3D positions of the one or more locations on the tracked portion of the object based at least in part on the obtained 2D positions.

2. The tracking system of claim 1, wherein:
the one or more images comprise two stereo images of the portion of the object; and
the system further comprises two infrared cameras configured to capture the two stereo images.

3. The tracking system of claim 1, wherein:
the first machine learning model includes at least one of a random forest method or a convolution neural network (CNN) method.

4. The tracking system of claim 1, wherein:
the second machine learning model includes at least one of a random forest method or a convolution neural network (CNN) method.

5. The tracking system of claim 1, wherein:
the hand positions are positions of bounding boxes defining the hand; and
detecting the portion of the object in each of the one or more images through the trained detection model comprises detecting the portion of the object in each of the one or more images through the detection model trained from at least one of the first or the second machine learning model.

6. The tracking system of claim 5, wherein training the detection model and the extraction model further comprises:
identifying positions of hand joints in the obtained images according to verified joint data as a ground truth of joints;
using the refined detection model to obtain cropped regions of the hand, the cropped regions corresponding to the bounding boxes; and
training a third machine learning model with the cropped regions of the hand and the ground truth of joints to obtain the extraction model, the third machine learning model including at least one of a random forest method or a convolution neural network (CNN) method.

7. The tracking system of claim 6, wherein training the detection model and the extraction model further comprises:
using the extraction model to predict positions of joints of the hand; and
training a fourth machine learning model with the predicted positions of the joints and the ground truth of joints to refine the extraction model, the fourth machine learning model including at least one of a random forest method or a convolution neural network (CNN) method.

8. The tracking system of claim 7, wherein obtaining the 2D positions of the one or more locations on the tracked portion of the object through the trained extraction model comprises obtaining the 2D positions of the one or more locations on the tracked portion of the object through the extraction model trained from at least one of the third or the fourth machine learning model.

9. The tracking system of claim 6, further comprising applying at least one of Kalman Filter, extended Kalman Filter, Mean Filter, or Medium Filter.

10. The tracking system of claim 1, wherein tracking the detected portion of the object in real-time comprises detecting the portion of the object continuously based on at least one of Particle Swarm Optimization (PSO), Particle Filter, Kalman Filter, extended Kalman Filter, Markov Chain Method, or Monte Carlo Method.

11. The tracking system of claim 1, wherein obtaining the 3D positions of the one or more locations on the tracked portion of the object based at least in part on the obtained 2D positions comprises obtaining the 3D positions of the one or more locations on the tracked portion of the object based at least in part on:
pairs of 2D joint positions from the two stereo images;
focal lengths of cameras respectively capturing the two stereo images; and
position information of the cameras.

12. The tracking system of claim 1, further comprising subjecting the obtained 3D positions of the one or more locations to one or more constraints to obtain refined 3D positions of the one or more locations, wherein the one or more constraints comprise a normal range of each hand bone length corresponding to distances among the hand joints.

13. The tracking system of claim 12, further comprising at least one a first and a second optimization methods, wherein:
the first optimization method comprises:
projecting the refined 3D positions to 2D to obtain projected 2D positions, comparing the projected 2D positions with the obtained 2D positions to obtain a first difference, and adjusting the refined 3D positions to minimize the first difference, obtaining optimized 3D positions; and
the second optimization method comprises:
comparing the refined 3D positions with the obtained 3D positions to obtain a second difference, and adjusting the refined 3D positions to minimize the second difference, obtaining optimized 3D positions.

14. The tracking system of claim 1, wherein:
the tracking system is disposed on a mobile device;
the mobile device is coupled to at least one of a local device or a cloud device;
the tracking system is configured to send failed detections to at least one of the local device or the cloud device;
the local device is configured to correct the failed detection, further training at least one of the detection or the extraction model; and
the cloud device is configured to correct the failed detection, further training at least one of the detection or the extraction model.

15. A tracking method, comprising:
training a detection model and an extraction model, comprising:
obtaining images of various hands of different people in different postures,
identifying hand positions in the obtained images according to verified hand data as a ground truth of hand,
training a first machine learning model with the obtained images and the ground truth of hand to obtain the detection model,
using the detection model to predict hand positions in the obtained images, and
training a second machine learning model with the ground truth of hand and the predicted hand positions in the obtained images to refine the detection model;
capturing one or more images of at least a portion of an object, wherein the portion of the object comprises a hand;
detecting the portion of the object in each of the one or more images through the trained detection model;
tracking the detected portion of the object in real-time;
obtaining 2D positions of one or more locations on the tracked portion of the object through the trained extraction model, wherein the one or more locations comprise one or more joints of the hand; and
obtaining 3D positions of the one or more locations on the tracked portion of the object based at least in part on the obtained 2D positions.

16. The tracking method of claim 15, wherein:
the one or more images comprise two stereo images of the portion of the object; and
the system comprises two infrared cameras configured to capture the two stereo images.

17. The tracking method of claim 15, wherein:
the first machine learning model includes at least one of a random forest method or a convolution neural network (CNN) method.

18. The tracking method of claim 15, wherein:
the second machine learning model includes at least one of a random forest method or a convolution neural network (CNN) method.

19. The tracking method of claim 15, wherein:
the hand positions are positions of bounding boxes defining the hand; and
detecting the portion of the object in each of the one or more images through the trained detection model comprises detecting the portion of the object in each of the one or more images through the detection model trained from at least one of the first or the second machine learning model.

20. The tracking method of claim 15, wherein tracking the detected portion of the object in real-time comprises detecting the portion of the object continuously based on at least one of Particle Swarm Optimization (PSO), Particle Filter, Kalman Filter, extended Kalman Filter, Markov Chain Method, or Monte Carlo Method.

21. The tracking method of claim 19, wherein training the detection model and the extraction model further comprises:
identifying positions of hand joints in the obtained images according to verified joint data as a ground truth of joints;
using the refined detection model to obtain cropped regions of the hand, the cropped regions corresponding to the bounding boxes; and
training a third machine learning model with the cropped regions of the hand and the ground truth of joints to obtain the extraction model, the third machine learning model including at least one of a random forest method or a convolution neural network (CNN) method.

22. The tracking method of claim 21, further comprising applying at least one of Kalman Filter, extended Kalman Filter, Mean Filter, or Medium Filter.

23. The tracking method of claim 21, wherein training the detection model and the extraction model further comprises:
using the extraction model to predict positions of joints of the hand; and
training a fourth machine learning model with the predicted positions of the joints and the ground truth of joints to refine the extraction model, the fourth machine learning model including at least one of a random forest method or a convolution neural network (CNN) method.

24. The tracking method of claim 23, wherein obtaining the 2D positions of the one or more locations on the tracked portion of the object through the trained extraction model comprises obtaining the 2D positions of the one or more locations on the tracked portion of the object through the extraction model trained from at least one of the third or the fourth machine learning model.

25. The tracking method of claim 15, wherein obtaining the 3D positions of the one or more locations on the tracked portion of the object based at least in part on the obtained 2D positions comprises obtaining the 3D positions of the one or more locations on the tracked portion of the object based at least in part on:
pairs of 2D joint positions from the two stereo images;
focal lengths of cameras respectively capturing the two stereo images; and
position information of the cameras.

26. The tracking method of claim 15, further comprising subjecting the obtained 3D positions of the one or more locations to one or more constraints to obtain refined 3D positions of the one or more locations, wherein the one or more constraints comprise a normal range of each hand bone length corresponding to distances among the hand joints.

27. The tracking method of claim 26, further comprising at least one a first and a second optimization methods, wherein:
the first optimization method comprises:
projecting the refined 3D positions to 2D to obtain projected 2D positions, comparing the projected 2D positions with the obtained 2D positions to obtain a first difference, and adjusting the refined 3D positions to minimize the first difference, obtaining optimized 3D positions; and
the second optimization method comprises:
comparing the refined 3D positions with the obtained 3D positions to obtain a second difference, and adjusting the refined 3D positions to minimize the second difference, obtaining optimized 3D positions.

28. The tracking method of claim 15, wherein:
the tracking system is disposed on a mobile device;
the mobile device is coupled to at least one of a local device or a cloud device;
the tracking system is configured to send failed detections to at least one of the local device or the cloud device;
the local device is configured to correct the failed detection, further training at least one of the detection or the extraction model; and
the cloud device is configured to correct the failed detection, further training at least one of the detection or the extraction model.

29. A non-transitory computer-readable storage medium storing instructions that, when executed by a processor, perform:
training a detection model and an extraction model, comprising:
obtaining images of various hands of different people in different postures,
identifying hand positions in the obtained images according to verified hand data as a ground truth of hand,
training a first machine learning model with the obtained images and the ground truth of hand to obtain the detection model,
using the detection model to predict hand positions in the obtained images, and
training a second machine learning model with the ground truth of hand and the predicted hand positions in the obtained images to refine the detection model;
capturing one or more images of at least a portion of an object, wherein the portion of the object comprises a hand;
detecting the portion of the object in each of the one or more images through the trained detection model;
tracking the detected portion of the object in real-time;
obtaining 2D positions of one or more locations on the tracked portion of the object through the trained extraction model, wherein the one or more locations comprise one or more joints of the hand; and
obtaining 3D positions of the one or more locations on the tracked portion of the object based at least in part on the obtained 2D positions.

30. The medium of claim 29, wherein obtaining the 3D positions of the one or more locations on the tracked portion of the object based at least in part on the obtained 2D positions comprises obtaining the 3D positions of the one or more locations on the tracked portion of the object based at least in part on:
pairs of 2D joint positions from the two stereo images;
focal lengths of cameras respectively capturing the two stereo images; and
position information of the cameras.

* * * * *